United States Patent [19]

Kartte et al.

[11] 3,856,924

[45] Dec. 24, 1974

[54] PRODUCTION OF HYDROXYLAMMONIUM NITRATE

[75] Inventors: Klaus Kartte, Frankenthal; Hugo Fuchs; Kurt Jockers, both of Ludwigshafen; Kurt Kahr, Hambach; Hermann Meier, Ludwigshafen, all of Germany

[73] Assignee: Badische Anilin- & Soda-Fabrik Aktiengesellschaft, Ludwigshafen/Rhine, Germany

[22] Filed: Dec. 27, 1971

[21] Appl. No.: 212,663

[30] Foreign Application Priority Data
Jan. 2, 1971  Germany............................ 2100036

[52] U.S. Cl................................. 423/387, 423/395
[51] Int. Cl............................................. C01b 21/14
[58] Field of Search............................ 423/387, 395

[56] References Cited
UNITED STATES PATENTS

| | | | |
|---|---|---|---|
| 2,628,888 | 2/1953 | Benson | 423/387 |
| 2,823,101 | 2/1958 | Jockers et al. | 423/387 |
| 2,827,363 | 3/1958 | Marhofer | 423/387 |
| 3,406,011 | 10/1968 | Zirngibl et al. | 423/387 |

*Primary Examiner*—G. O. Peters
*Attorney, Agent, or Firm*—Johnston, Keil, Thompson & Shurtleff

[57] ABSTRACT

Production of an aqueous solution of hydroxylammonium nitrate by catalytic reduction of nitrogen monoxide with hydrogen in acid solution, a platinum catalyst being used which has been partly poisoned with one or more elements of main groups V and/or VI of the Periodic Table and activated prior to the beginning of the reaction in an aqueous suspension with hydrogen. Nitric acid is continuously supplied during the reaction in an amount necessary for the end concentration of hydroxylammonium nitrate.

5 Claims, No Drawings

PRODUCTION OF HYDROXYLAMMONIUM NITRATE

This invention relates to a process for the production of an aqueous solution of hydroxylammonium nitrate by reduction of nitrogen monoxide with hydrogen in dilute aqueous acid in the presence of a supported platinum catalyst.

It is known that hydroxylamine can be prepared in the form of its sulfate by catalytic hydrogenation of nitrogen monoxide in dilute sulfuric acid as the reaction medium. An aqueous hydroxylammonium sulfate solution is obtained which is mainly used for the production of omega-lactams.

There are other known methods of catalytic hydrogenation of nitric oxide which result for example in the chlorides, phosphates or acetates. The use of hydrochloric acid for the production of the chloride involves corrosion problems and the ammonium chloride obtained in the oximation has but little industrial importance. Lower yields are obtained in the production of hydroxylammonium phosphates and acetates because of the low acidity of the acids used.

It is known from German Patent No. 698,363 that apart from hydrochloric acid, phosphoric acid and sulfuric acid it is possible to use nitric acid for the reaction of nitric oxide and hydrogen in the presence of a 10% platinum catalyst. Contrasted with the other acids, no statement as to yield is made in the case of nitric acid, hydroxylamine merely being said to have been detected.

We have now found that hydroxylammonium nitrate is obtained in high space-time yields and with a high selectivity by reduction of nitrogen monoxide with hydrogen in dilute nitric acid in the presence of a supported platinum catalyst, when a platinum catalyst is used which has been partly poisoned with one or more elements of main groups V and/or VI of the Periodic Table and has been activated with hydrogen in an aqueous suspension prior to the beginning of the reaction, the nitric acid being supplied in the amount necessary for the end concentration of hydroxylammonium nitrate as the reaction proceeds.

In carrying out the process of the invention the catalyst may be suspended in water in a stirred vessel and activated by prolonged passage of hydrogen therethrough at about 40°C. Only after this is nitric acid in a concentration of 40 to 100% supplied in such an amount that the mixture is about 1.5N in nitric acid, while supplying hydrogen continuously. Then a mixture of the gases to be reacted is introduced while stirring vigorously, preferably in the molar ratio $H_2$:NO of from 1.7:1 to 2:1 in such an amount that a certain amount of offgas is obtained throughout the whole duration of the reaction to remove the inert gas introduced and formed. The concentrated nitric acid is added at such a rate that the concentration of free acid is from 1 to 2 equivalents per liter. Only toward the end of the reaction (which is stopped at a hydroxylamine concentration of the resultant solution of from 80 to 200 grams per liter, preferably from 110 to 130 grams per liter, is the concentration of free acid allowed to fall to 0.1 to 0.3N and the reaction gas is replaced by nitrogen. After the hydroxylammonium nitrate solution formed has been separated from the catalyst, the latter can be used again for further reactions.

The catalyst is immediately inactivated if it is brought into contact at the start with the whole of the amount of nitric acid before the treatment with hydrogen has taken place. This means that the ability for the partly poisoned platinum catalyst to function is only ensured if there is continually maintained on its suface a protective layer of hydrogen. When using non-oxidizing acids this is not necessary.

Catalysts containing platinum metal described in German Patent No. 956,038 which have been partly poisoned by one or more than one element of main groups V and/or VI of the Periodic Table may for example be used as the catalysts.

Activation with hydrogen will also be without lasting effect if from the start 3.5 to 4.5N nitric acid is used such as is necessary for achieving an about 10% hydroxylamine solution. It is only when both conditions are maintained (activation with hydrogen and stagewise addition of the necessary amount of nitric acid during the reaction) that satisfactory yields and good space-time yields are obtained.

Hydroxylammonium nitrate solution of the specified concentration prepared according to the invention are completely stable. No further decompositon can be detected even after heating for several hours at 100°C than in the case for example of a hydroxylammonium sulfate solution.

The higher space-time yields in the hydrogenation of nitric oxide and the lower formation of ammonia are attributable to the fact that nitric acid is a stronger mineral acid than for example sulfuric acid.

Contrasted with the dibasic sulfuric acid, high yields are obtained in the reaction of the mixture of nitric oxide and hydrogen in the nitric acid even at low acid concentration. This is of particular importance for a single-stage continuous method which can only be operated economically at the lowest possible concentration of free acid. The decreased speed of reaction at low acid concentration and high salt concentration can be counteracted by using superatmospheric pressure.

The reaction may be carried out at atmospheric pressure or superatmospheric pressure. The optimum pressure is 1:1 to 6 atmospheres.

The use of nitric acid has the further advantage that it does not have to be purified prior to the hydroxylamine synthesis because even the commercial grade is normally free from constituents which would damage the catalyst. In contrast to this, commercial sulfuric acid has to be freed from many trace elements by a special purification prior to its use.

Furthermore the use of nitric acid lessens the risk of corrosion provided alloy steel is used as the material for the reactor. The reaction is generally carried out at a temperature of from 0° to 80°C, preferably from about 30° to 50°C. At temperatures below these ranges the speed of reaction is noticeably less while above 50°C side reactions are favored and increasing waste of nitric acid occurs.

The process according to the invention may also be carried out continuously in one or more stages, for example by supplying nitric acid to the individual stages or by returning some of the reaction solution obtained in the final stage to the first stage so as to maintain the concentration of free acid in the desired range.

The following Example illustrates the invention.

EXAMPLE 200 g of a 0.5% platinum-graphite catalyst which has been partially poisoned with sulfur and 3.5 liters of distilled water are placed in a stirred alloy steel vessel. After the catalyst has been activated with hydrogen at 40°C, 0.5 liter of 65% $HNO_3$ is first introduced and 100 liters per hour of a mixture of 65.2% by volume of $H_2$ and 34.8% by volume of nitric oxide (the remainder being nitrogen) is passed in with vigorous stirring, the reaction temperature being kept at from 40° to 42°C. A concentration of free acid of 1.5 to 2N is maintained by adding a total of 1980 ml of concentrated $HNO_3$. After a total of 1880 liters of synthesis gas has been passed in, a concentration of 122 g/liter of $NH_2OH$ is reached and the reaction is stopped. The solution (5.94 liters) still contains 17.8 g/liter of free $HNO_3$ and 3.85 g/liter of $NH_3$ combined as nitrate. The offgas (of which the total amount is 300 liters) contains 63.3% by volume of $H_2$, 11.3% by volume of NO, 15.1% by volume of $N_2O$ and 0.7% of $N_2$. The space-time yield is 66 g of $NH_2OH$ per gram of Pt per hour. The waste of $HNO_3$ is 7.7% based on the amount used. The conversion of NO is calculated as 94% and that of $H_2$ as 83%. The yield of $NH_2OH$ based on NO used is 85%, and based on $H_2$ is 66% and the selectivity is 86.5%.

If on the other hand the reaction of the mixture of $NO/H_2$ is carried out under the same reaction conditions in a 4.3N $H_2SO_4$ with the difference that the acid is present from the start, a hydroxylammonium sulfate solution is obtained having a content of 119 g/liter of $NH_2OH$, 4.1 g/liter of $NH_3$, both combined as sulfate, and 17.5 g/liter of free $H_2SO_4$. The space-time yield is only 54 g of $NH_2OH$ per g of platinum per hour.

We claim:

1. A process for the production of an aqueous solution of hydroxylammonium nitrate by reduction of nitrogen monoxide with hydrogen in dilute aqueous nitric acid in the presence of a supported platinum catalyst wherein a platinum metal catalyst is used which has been partially poisoned with sulfur and prior to the beginning of said reduction has been activated with hydrogen in an aqueous suspension and wherein the nitric acid is supplied as the reaction proceeds in an amount required for the final concentration of hydroxylammonium nitrate.

2. A process as claimed in claim 1 wherein the reaction is carried out continuously.

3. A process as claimed in claim 1 carried out at a temperature of from 30° to 50°C.

4. A process as claimed in claim 1 carried out at superatmospheric pressure.

5. A process as claimed in claim 1 wherein the support for said platinum catalyst is graphite.

* * * * *

UNITED STATES PATENT AND TRADEMARK OFFICE
CERTIFICATE OF CORRECTION

PATENT NO. : 3,856,924

DATED : December 24, 1974

INVENTOR(S) : Klaus Kartte, H. Fuchs, K. Jockers, K. Kahr, and H. Meier

It is certified that error appears in the above-identified patent and that said Letters Patent are hereby corrected as shown below:

Column 2, line 45, delete "1:1 to 6" and substitute --1.1 to 6--.

Column 4, line 16, delete "is supplied as the" and substitute --is supplied to said suspension after the activation of the catalyst and as the--.

Signed and Sealed this

Twenty-seventh Day of July 1976

[SEAL]

Attest:

RUTH C. MASON
Attesting Officer

C. MARSHALL DANN
Commissioner of Patents and Trademarks